United States Patent
Lee et al.

(10) Patent No.: US 12,487,281 B2
(45) Date of Patent: Dec. 2, 2025

(54) STORAGE SYSTEM AND AN OPERATING METHOD THEREOF

(71) Applicant: SAMSUNG ELECTRONICS CO., LTD., Suwon-si (KR)

(72) Inventors: Ganggyu Lee, Suwon-si (KR); Insup Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 65 days.

(21) Appl. No.: 18/519,444

(22) Filed: Nov. 27, 2023

(65) Prior Publication Data

US 2024/0353486 A1 Oct. 24, 2024

(30) Foreign Application Priority Data

Apr. 19, 2023 (KR) .................. 10-2023-0051503

(51) Int. Cl.
*G01R 31/317* (2006.01)
*G01R 31/3185* (2006.01)

(52) U.S. Cl.
CPC . *G01R 31/31724* (2013.01); *G01R 31/31705* (2013.01); *G01R 31/31721* (2013.01); *G01R 31/318566* (2013.01)

(58) Field of Classification Search
None
See application file for complete search history.

(56) References Cited

U.S. PATENT DOCUMENTS

| 5,729,552 | A | 3/1998 | Yorimitsu |
| 8,037,380 | B2 | 10/2011 | Cagno et al. |
| 10,055,321 | B2 | 8/2018 | Keshava et al. |
| 10,552,362 | B2 | 2/2020 | Hong et al. |
| 11,269,707 | B2 | 3/2022 | Liang et al. |
| 2008/0016420 | A1* | 1/2008 | Chae ............ G11C 29/16 714/E11.163 |
| 2016/0358669 | A1 | 12/2016 | Keshava et al. |
| 2018/0313894 | A1* | 11/2018 | Suzuki ........ G01R 31/318597 |
| 2020/0320807 | A1* | 10/2020 | Gorti ............ B60W 60/001 |
| 2021/0065836 | A1* | 3/2021 | Ahn ............ G11C 29/46 |

FOREIGN PATENT DOCUMENTS

| CN | 102968350 | 3/2013 | |
| JP | H08-153047 | 6/1996 | |
| KR | 10-2450553 | 10/2022 | |
| WO | WO-2004104840 A2 * | 12/2004 | ........... G06F 11/106 |

* cited by examiner

*Primary Examiner* — Guerrier Merant
(74) *Attorney, Agent, or Firm* — MORGAN, LEWIS & BOCKIUS LLP

(57) ABSTRACT

A storage system including: a storage device; a diagnosis circuit that generates a test pattern, transmits the test pattern to the storage device, receives result data corresponding to the test pattern from the storage device, and tests whether the storage device normally operates by comparing the test pattern with the result data; and a debugging port that is connected to the diagnosis circuit, receives auxiliary power from an external device, supplies the auxiliary power to the diagnosis circuit, and transmits data in the storage device to the external device.

20 Claims, 9 Drawing Sheets

STORAGE SYSTEM AND AN OPERATING METHOD THEREOF

CROSS-REFERENCE TO RELATED APPLICATION

This application claims priority under 35 U.S.C. § 119 to Korean Patent Application No. 10-2023-0051503 filed in the Korean Intellectual Property Office on Apr. 19, 2023, the disclosure of which is incorporated by reference herein in its entirety.

(a) TECHNICAL FIELD

The present disclosure relates to a storage system and an operation method of the storage system.

(b) DESCRIPTION OF THE RELATED ART

As automated driving systems gain in popularity, vehicles are being equipped with advanced driver assistance systems (ADAS) or automatic driving (AD) functions. Accordingly, in the event of an in-vehicle issue or accident, it is important to determine whether the driver or the automated driving system was in control at the time of the accident.

On the other hand, a data storage system for automated driving vehicles (DSSAD) is designed to detect accidents and record interactions between the vehicle and its driver. This includes the driving state of either the vehicle or the driver within a predetermined time before and after the accident, as well as any operational information related to the driver. Data stored in an event data recorder (EDR) plays an important role in identifying the subject of a vehicle responsible for an accident. However, there is a concern that data stored in the EDR may be damaged or changed due to improper readings technique following an accident.

SUMMARY

The present disclosure aims to read driving data stored in a vehicle's storage device without corrupting the driving data when a vehicle accident occurs.

According to the embodiment according to present disclosure, there is provided a storage system including: a storage device; a diagnosis circuit that generates a test pattern, transmits the test pattern to the storage device, receives result data corresponding to the test pattern from the storage device, and tests whether the storage device normally operates by comparing the test pattern with the result data; and a debugging port that is connected to the diagnosis circuit, receives auxiliary power from an external device, supplies the auxiliary power to the diagnosis circuit, and transmits data in the storage device to the external device.

According to the embodiment according to present disclosure, there is provided an operation method of a storage system including: connecting auxiliary power to a debugging port of a storage system including a storage device in which driving data about a vehicle and its drivers are stored; determining whether a diagnosis circuit, which tests whether the storage device normally operates as the auxiliary power is input, normally operates by using a built-in self-test (BIST) circuit in the diagnosis circuit; determining whether the storage device normally operates when the diagnosis circuit normally operates; and reading the driving data through the debugging port when the storage device normally operates.

According to the embodiment according to present disclosure, there is provided a computing system including: an external device; and a storage system that includes a storage device in which driving data about a vehicle and its drivers are stored, and a diagnosis circuit that generates a test pattern, transmits the test pattern to the storage device, receives result data corresponding to the test pattern from the storage device, and determines whether the storage device normally operates by comparing the test pattern with the result data, wherein the storage system transmits the driving data to the external device through a side band interface (SBI) when the storage device is normally operating.

According to an embodiment of present disclosure, the risk of additional damage to data stored in a storage device can be prevented.

DETAILED DESCRIPTION OF THE EMBODIMENTS

Figure 1:
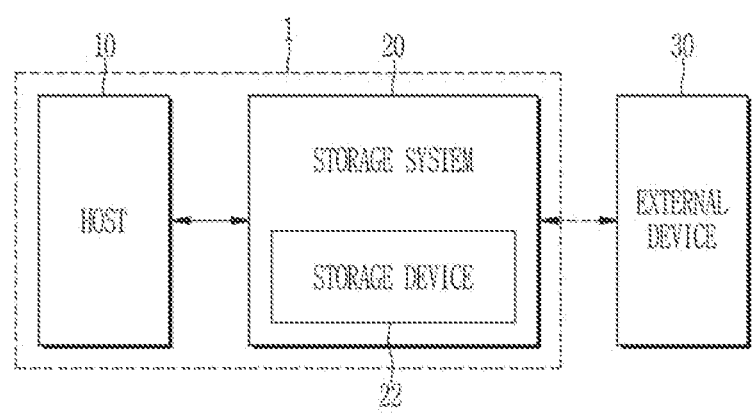
FIG. 1 illustrates a computing system according to an embodiment of the present disclosure, and an external device connected to the computing system.

In the following detailed description, only certain embodiments of the present disclosure are shown and described. As those skilled in the art would realize, the described embodiments may be modified in different ways, without departing from the spirit or scope of the present disclosure.

Accordingly, the drawings and description are illustrative in nature and not restrictive. Like reference numerals designate like elements throughout the specification. In the flowcharts described herein, the order of operations may be changed, several operations may be merged, a certain operation may be divided, and a specific operation may not be performed.

In addition, expressions described in the singular may be construed in the singular or plural unless an explicit expression such as "one" or "single" is used. The terms including ordinal numbers such as first, second, etc. may be used to describe various elements, but the elements are not limited by these terms. The terms including ordinal numbers are used for the purpose of distinguishing one element from another element. The terms "at least one of A and B" should be understood to mean only A, only B, or both A and B.

FIG. 1 illustrates a computing system according to an embodiment of the present disclosure, and an external device connected to the computing system.

In an embodiment, a computing system 1 may be an in-vehicle data recording system. The vehicle may operate in an automated driving mode. The automated driving mode may be a mode in which the vehicle is autonomously driven. The vehicle may collect information about its surrounding environment through a sensor mounted on the vehicle and operate without human involvement.

In the automated driving mode, the vehicle may detect an obstacle based on the information collected through the sensor, and may perform an operation to avoid the detected obstacle or set a driving direction of the vehicle.

The computing system 1 may include a host 10 and a storage system 20.

The host 10 may generate data related to interactions between the driver and the automated driving system.

In an embodiment, the host 10 may generate various types of driving data related to the vehicle's operation or the driver's behavior. The driving data may include state change data of the automated driving system. The automated driving system may be in a state in which it is switched-off, activated, overridden or transition is requested. The driving data may include data on the vehicle's operation over time, such as initiation and termination of a minimum risk maneuver (MRM) by an automated driving system, transfer of control of a driving task to a driver, and the like. In some embodiments, the driving data may further include data over time-specific details related to driver behavior including driving date, driving time, identity of driver, reason for driver change, and the like. For example, the driving data may include information about a vehicle control subject (e.g., driver or automated driving system) at a specific point in time.

In some embodiments, the host 10 may store the driving data in the storage system 20. When a vehicle accident occurs, the host 10 may read the driving data stored in the storage system 20 and identify the subject in control of the vehicle at the time of the accident based on the driving data.

The storage system 20 may store or provide data according to an external request. For example, the storage system 20 may be a data storage system for automated driving vehicles (DSSAD) which is used to give a clear picture of the significant interactions between the driver and the automated driving system. For example, the storage system 20 is a data storage system installed in vehicles equipped with a highly-automated driving system, aiming to clearly identify a "subject who received a driving request" and a "subject who actually drove."

For example, during a transfer procedure in which the driver requests the automated driving system to drive (e.g., from the issuance of the transfer request until the automated driving system actually takes over control), the "subject requested to drive" and the "subject actually driving" may be different from each other.

The storage system 20 may include a storage device 22. The storage device 22 may be implemented with various non-volatile memory elements such as an electrically erasable and programmable read only memory (EEPROM), a NAND flash memory, a NOR flash memory, a phase-change random access memory (PRAM), a resistive RAM (ReRAM), a ferroelectric RAM (FRAM), a spin-torque magnetic RAM (STT-MRAM), and the like.

In some embodiments, the storage system 20 may store driving data received from the host 10 in the storage device 22.

When the ignition of the vehicle enters the on state, the storage device 22 may receive power from a main power supply. In an embodiment, the storage device 22 may receive main power from the host 10. When the main power is supplied to the storage device 22, the storage device 22 may receive driving data from the host 10 and store the received driving data. When the main power is supplied to the storage device 22, the host 10 may read the driving data stored in the storage device 22. In some instances, the storage device 22 may not be able to receive power from the main power source. For example, it may be impossible to enter the on state of the vehicle due to fire, flooding, scrapping, and the like, and thus, power may not be supplied to the storage device 22. In this case, the host 10 cannot read the driving data stored in the storage device 22.

In some embodiments, when a storage space ratio of the storage device 22 reaches a threshold value, the storage device 22 may sequentially delete driving data according to the order in which the driving data is stored. For example, the storage device 22 may be configured to first delete driving data with a long period of storage in the storage device 22.

The external device 30 may be connected to the storage system 20 to read driving data from the storage system 20. In some embodiments, the external device 30 may be connected to the storage system 20 when the host 10 cannot read driving data from the storage system 20. For example, the external device 30 may be a debugging tool such as a personal computer or a server. In other words, the external device 30 may be a debugger.

The external device 30 may supply auxiliary power to the storage system 20. The storage system 20 may perform self-diagnosis under the control of the external device 30 or independently. In some embodiments, the storage system 20 may perform self-diagnosis in response to auxiliary power input from the external device 30. The storage system 20 may read the driving data stored in the storage device 22 based on a result of the self-diagnosis, and transmit the read driving data to the external device 30.

Figure 2:
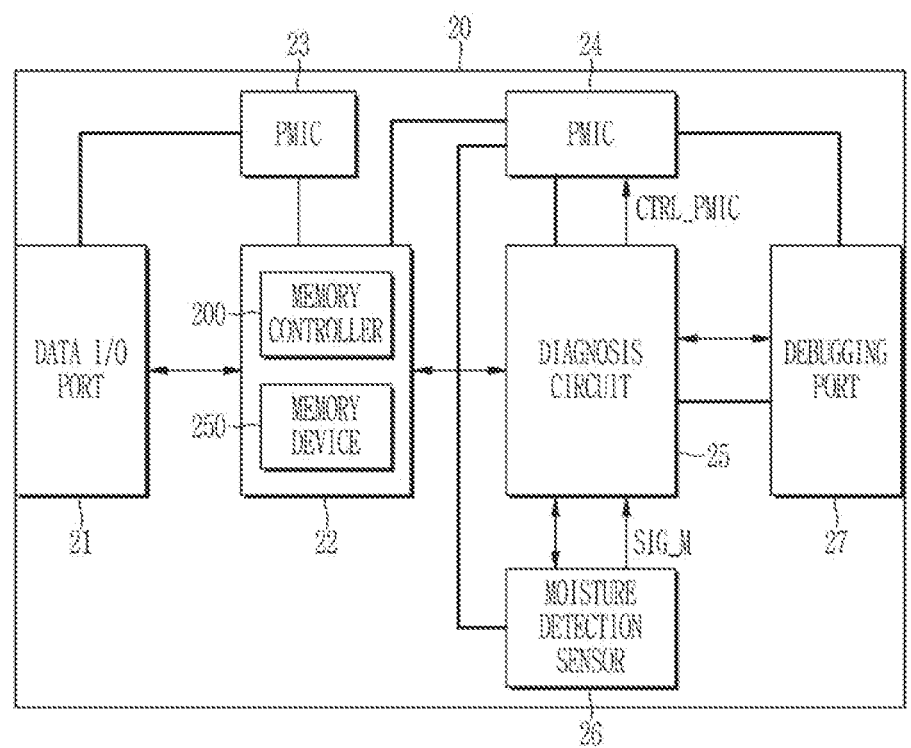
FIG. 2 shows a storage system according to an embodiment of the present disclosure.
Figure 3:
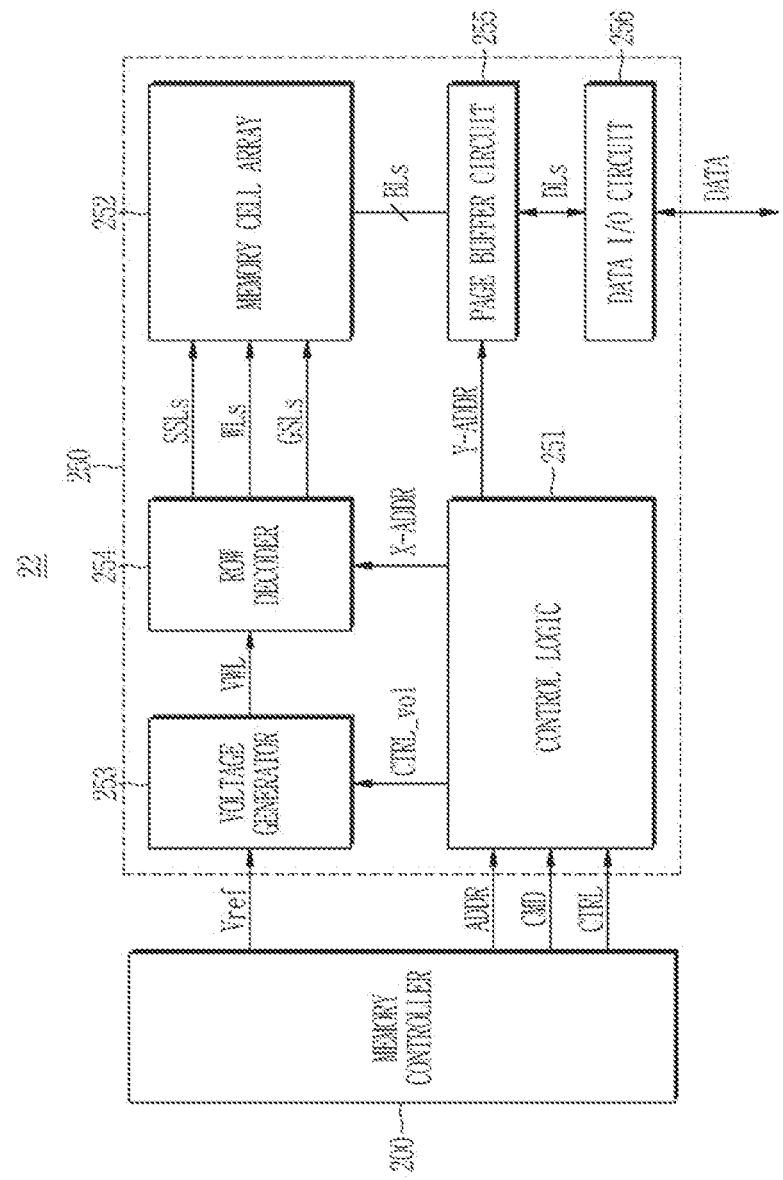
FIG. 3 shows a storage device according to an embodiment of the present disclosure.

FIG. 2 shows the storage system according to an embodiment of the present disclosure, and FIG. 3 shows the storage device according to an embodiment of the present disclosure.

As shown in FIG. 2, the storage system 20 may include a data I/O port 21, a storage device 22, a first power management integrated circuit (PMIC) 23, a second PMIC 24, a diagnosis circuit 25, a moisture detection sensor 26, and a debugging port 27.

The data input and output (IO) port 21 may communicate with a host (10 of FIG. 1). The data IO port 21 may provide a communication channel with the host. The data IO port 21 may provide a physical connection between the host 10 and the storage system 20.

The data IO port 21 may provide an interface with the storage system 20 corresponding to a bus format of the host 10. Here, the data IO port 21 may be, for example, an interface such as serial advanced technology attachment (SATA), a fiber channel interface, a serial attached SCSI (SAS) interface, a non-volatile memory express (NVMe) interface, Ethernet, a universal serial bus (USB), and the like.

The storage device 22 may store driving data of a vehicle where the storage system 20 is mounted. In some embodiments, the storage device 22 may transmit/receive data to/from the host (10 refer to FIG. 1) through the data IO port 21.

Referring to FIG. 3 together, the storage device 22 may include a memory controller 200 and a memory device 250.

The memory controller 200 may control access to the memory device 250. For example, the memory controller 200 may read data from the memory device 250 by executing a read instruction. The memory controller 200 may transmit the read data to the host (10 refer to FIG. 1) through the data IO port 21. In addition, the memory controller 200 may program the data received from the host 10 to the memory device 250 by executing a program instruction.

The memory device 250 may include a flash memory. For example, the flash memory may include a two-dimensional (2D) NAND memory array or a three-dimensional (3D) (or vertical type) NAND (VNAND) memory array. In an embodiment, the memory device 250 may include a phase-change memory, a resistive memory, a magnetoresistive memory, a ferroelectric memory, or a polymer memory.

The memory device 250 may include a control logic 251, a memory cell array 252, a voltage generator 253, a row decoder 254, a page buffer circuit 255, and a data input and output circuit 256.

The control logic 251 controls the voltage generator 253, the row decoder 254, and the page buffer circuit 255 in response to a command CMD and an address ADDR transmitted from the memory controller 200. For example, the address ADDR may include a column address signal X-ADDR and a row address signal Y-ADDR.

The control logic 251 may generate a control signal for controlling the memory cell array 252, the voltage generator 253, the row decoder 254, and the page buffer circuit 255. For example, the control signal may include various signals for programing data to the memory cell array 252 or reading data from the memory cell array 252. In an embodiment, the control signal may include an initialization signal, the column address signal X-ADDR, the row address signal Y-ADDR, and a voltage control signal CTRL_vol. The control logic 251 may control the page buffer circuit 255 to perform a read operation and a program operation for a memory cell selected by the row decoder 254 using a control signal.

The memory cell array 252 may store data transmitted from the page buffer circuit 255 under the control of the control logic 251. The memory cell array 252 may output stored data to the page buffer circuit 255 under the control of the control logic circuit 251.

The memory cell array 252 may include a plurality of memory cells. The memory cell array 252 may be connected to the page buffer circuit 255 through bit lines BLs. The memory cell array 252 may be connected to the row decoder 254 through word lines WLs, string selection lines SSLs, and ground selection lines GSLs. The plurality of memory cells may be read or programed by a voltage provided by at least one of bit lines BLs and word lines WLs.

In some embodiments, the memory cell array 252 may include a 3D memory cell array. For example, the memory cell array 252 may include a plurality of NAND cell strings. A channel of each of the cell strings may be vertically or horizontally formed. Each NAND cell string may include a memory cell connected to the word lines WLs that are sequentially stacked on the substrate. However, the present disclosure is not limited thereto, and the memory cell array 252 may include a 2D memory cell array.

The voltage generator 253 may be supplied with a reference voltage Vref from the memory controller 200, and may generate various voltages for driving the memory device 250 based on the reference voltage Vref. In some embodiments, the reference voltage Vref may be the main power supplied through the data IO port 21. In another embodiment, the reference voltage Vref may be auxiliary power supplied through the debugging port 27.

In some embodiments, the voltage generator 253 may generate various types of voltages based on the reference voltage Vref for performing read, program, and erase operations according to the voltage control signal CTRL_vol provided by the control logic 251. For example, the voltage generator 253 may generate a program voltage, a read voltage, a program verifying voltage, an erase voltage, and the like as a word line voltage VWL.

The row decoder 254 may be connected to the memory cell array 252 through a plurality of word lines WLs, a plurality of string selection lines SSLs, and a plurality of ground selection lines GSLs. The row decoder 254 may select one memory block of the memory cell array 252 in response to the column address signal X-ADDR received from the control logic 251. In other words, the row decoder 254 may select one word line WL among the plurality of word lines WLs in response to the column address signal X-ADDR. The row decoder 254 may provide a voltage corresponding to the operation of the memory block to a word line WL of the selected memory block.

The page buffer circuit 255 may be connected to the memory cell array 252 through the plurality of bit lines BLs. The page buffer circuit 255 may select at least one bit line among the plurality of bit lines BL in response to the row address Y-ADDR. The page buffer circuit 255 may operate as a program driver or a sense amplifier according to an operation mode. For example, during a program operation, the page buffer circuit 255 may supply a bit line voltage corresponding to data to be programmed to a selected bit line BL. During a read operation, the page buffer circuit 255 may sense the data stored in a memory cell by sensing a current or voltage of a selected bit line BL.

The data input and output circuit 256 may be connected to the page buffer circuit 255 via data signal lines DLs. The data input and output circuit 256 may provide externally provided data DATA to the page buffer circuit 255. In addition, the data input and output circuit 256 may output data latched by the page buffer circuit 255 to the outside.

Referring back to FIG. 2, the first PMIC 23 may supplied power to the storage device 22 based on externally supplied power. In some embodiments, the first PMIC 23 may receive power from the outside through the data IO port 21. For example, the data IO port 21 may be connected with an external main power source, and may receive power from the main power source. In some embodiments, the first PMIC 23 may be integrated with the storage device 22.

The second PMIC 24 may supply power to various types of hardware of the storage system 20 based on the externally supplied power. For example, the second PMIC 24 may supply power to the diagnosis circuit 25. As another example, the second PMIC 24 may supply power to the storage device 22 or the moisture detection sensor 26. In an embodiment, the second PMIC 24 may supply power input through the debugging port 27 to the storage device 22 under the control of the diagnosis circuit 25.

In some embodiments, the second PMIC 24 may receive external power through the debugging port 27. In this case, for example, the debugging port 27 is connected with an external auxiliary power source and receives power therefrom. For example, when no power is provided to the first PMIC 23, the second PMIC 24 may supply power to the storage device 22 based on the input power provided via the debugging port 27.

In FIG. 2, it is illustrated that the first PMIC 23 and the second PMIC 24 are shown as separate components, but the present disclosure is not limited thereto, and the first PMIC 23 and the second PMIC 24 may be formed of one PMIC.

The diagnosis circuit 25 may determine whether the diagnosis circuit 25 is operating normally and whether components within the storage system 20 are operating normally.

For example, based on self-diagnostic firmware (SDFW), the diagnosis circuit 25 may check whether it is operating normally. When the diagnosis circuit 25 receives power from the second PMIC 24, the self-diagnostic firmware of the diagnosis circuit 25 may be activated. The diagnosis circuit 25 may perform a self-diagnosis operation to check whether it is operating normally through the activated self-diagnosis firmware. In addition, the diagnosis circuit 25 may perform a test operation to check whether other components in the storage system 20 operate normally. For example, the diagnosis circuit 25 may transmit a test signal to the storage device 22, receive a response from the storage device 22 with respect to the test signal, and determine whether the storage device 22 normally operates based on the received response. In addition, the diagnosis circuit 25 may transmit a test signal to the moisture detection sensor 26, receive a response from the moisture detection sensor 26 with respect to the test signal, and determine whether the moisture detection sensor 26 operates normally based on the received response.

In addition, the diagnosis circuit 25 may generate a PMIC control signal CTRL_PMIC for controlling the second PMIC 24 based on the result of the self-diagnosis operation and the examination operation of the other components of the storage system 20.

The moisture detection sensor 26 may detect moisture present in the storage system 20. In some embodiments, the moisture detection sensor 26 may output a moisture signal SIG_M based on the detected moisture. In other words, the moisture detection sensor 26 may digitize the amount of moisture inflow into the storage system 20. The moisture detection sensor 26 may transmit a signal generated by digitizing the amount of detected moisture to the diagnosis circuit 25. The moisture detection sensor 26 may generate the moisture signal SIG_M having a different signal size according to the degree to which the storage system 20 is submerged.

For example, the moisture detection sensor 26 may be an electrical resistance type moisture detection sensor that uses a material whose electrical resistance changes when moisture is absorbed.

As another example, the moisture detection sensor 26 may be of the electrical capacity type that operates based on a change in electrical capacity. This change is due to a dielectric constant that changes in response to humidity by filling a dielectric material that reacts to moisture between at least two capacitors. For example, the moisture detection sensor 26 may include a first electrode and a second electrode disposed apart from the first electrode. When liquid penetrates into the storage system 20, the first electrode and the second electrode may be electrically shorted by the liquid penetrating between the first electrode and the second electrode of the moisture detection sensor 26. The moisture detection sensor 26 may be electrically short-circuited to generate the moisture signal SIG_M. If liquid penetrates the majority of the space between the first and second electrodes, this could indicate a serious case of submersion. Conversely, when the liquid penetrates a portion of the space between the first and second electrodes, the degree of submersion may be slight. The moisture detection sensor 26 may generate a moisture signal SIG_M with a larger signal intensity in a case of serious submersion as compared to a case of mild submersion. Conversely, the moisture detection sensor 26 may generate a moisture signal SIG_M having a smaller signal intensity when minor submersion occurs as compared to when severe submersion occurs. The moisture signal SIG_M generated by the moisture detection sensor 26 may be transmitted to the diagnosis circuit 25.

On the other hand, the present disclosure is not limited thereto, and the moisture detection sensor 26 may be configured with any sensor for detecting moisture.

The diagnosis circuit 25 may receive a moisture signal SIG_M representing the amount of moisture present in the storage system 20 from the moisture detection sensor 26. The diagnosis circuit 25 may derive the amount of moisture currently flowing into the storage system 20 based on the moisture signal SIG_M received from the moisture detection sensor 26. When the amount of moisture measured by the moisture detection sensor 26 is greater than the amount of moisture previously predetermined by the diagnosis circuit 25, the diagnosis circuit 25 may determine that the storage system 20 is in an abnormal state. In this case, the diagnosis circuit 25 may control the second PMIC 24 such that power is not supplied to the storage device 22 and the moisture detection sensor 26. The diagnosis circuit 25 may further determine that the storage system 20 requires water removal, and may thus, output information through the debugging port 27, the information indicating that water removal is required. For example, the diagnosis circuit 25 may output information through the debugging port 27 that the storage system 20 needs to remove moisture until the intensity (e.g., size) of the moisture signal SIG_M is less than the threshold value. When the size of the received moisture signal SIG_M is less than the threshold value, the diagnosis circuit 25 may determine that the degree of submersion of the storage system 20 is minor and that the storage system 20 is in a normal state.

The debugging port 27 may provide interfacing with the storage system 20 and an external device (30 of FIG. 1). The debugging port 27 may further include a protocol converter for transmitting a command or an address received from the external device 30 to the storage device 22.

In some embodiments, the debugging port 27 may transmit data received from the storage device 22 through the diagnosis circuit 25 to the external device 30 (of FIG. 1) through a side band interface (SBI). The SBI may include additionally communication interfaces, beyond the communication interface provided for normal operation. For example, the SBI may be a I2C interface (inter-integrated circuit interface) using an I2C communication, a management component transport protocol (MCTP), SMBus, a joint test action group (JTAG), or a serial wire protocol. For example, the storage system 20 and the external device 30 may be connected to each other through separate wirings other than wirings provided on a printed circuit board (PCB).

It is to be understood, however, that the present disclosure is not limited thereto, and the debugging port 27 may use various interfaces such as a system management bus (SMBus), a universal asynchronous receiver transmitter (UART), a serial peripheral interface (SPI), a high-speed inter-chip (HSIC), and the like.

Figure 4:
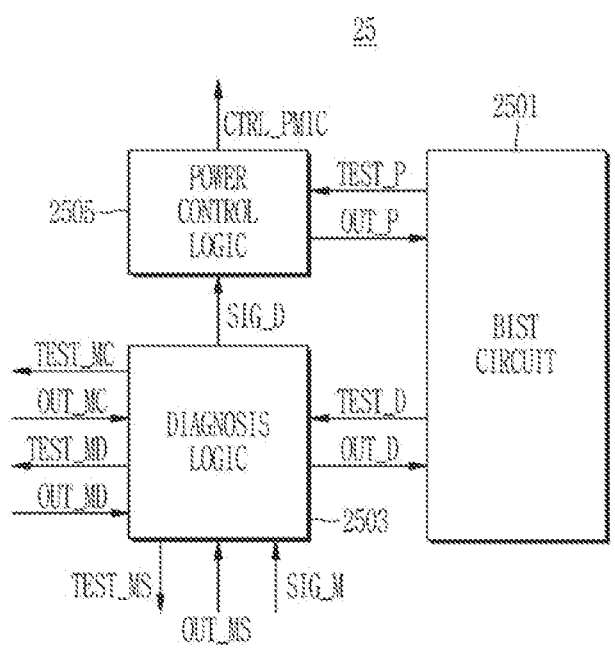
FIG. 4 shows a diagnosis circuit according to an embodiment of the present disclosure.

FIG. 4 shows a diagnosis circuit according to an embodiment of the present disclosure.

Referring to FIG. 4, the diagnosis circuit 25 may include a built-in self-test (BIST) circuit 2501, a diagnosis logic 2503, and a power control logic 2505. The diagnosis logic 2503 and the power control logic 2505 may each be implemented in hardware as circuits.

The BIST circuit 2501 may perform a self-diagnosis operation to check whether all or part of diagnosis circuit 25 functions normally. For example, the BIST circuit 2501 may obtain a calculated result value by performing a predetermined calculation in advance. In addition, the BIST circuit 2501 may store a result value from a predetermined calculation performed by the BIST circuit 2501 in advance when the BIST circuit 2501 operates normally. The BIST circuit 2501 may determine whether the BIST circuit 2501 normally operates by comparing the obtained calculated result value with a pre-stored result value. For example, the BIST circuit 2501 may determine that the BIST circuit 2501 is abnormal when the calculated result value and the pre-stored result value are different. For example, the BIST circuit 2501 may determine that the BIST circuit 2501 is normal when the calculated result value and the pre-stored result value are the same.

In some embodiments, the BIST circuit 2501 may perform a self-diagnosis operation as auxiliary power is input. When the self-diagnosis operation performed by the BIST circuit 2501 is not completed within a predetermined time, the BIST circuit 2501 may determine that the diagnosis circuit 25 is abnormal.

In some embodiments, the BIST circuit 2501 may check that the power control logic 2505 is operating normally. For example, the BIST circuit 2501 may generate a power test pattern TEST_P for determining normal operation of the power control logic 2505. The BIST circuit 2501 may transmit the power test pattern TEST_P to the power control logic 2505. The power control logic 2505 may generate result data OUT_P in response to the power test pattern TEST_P, and may transmit the result data OUT_P to the BIST circuit 2501. The BIST circuit 2501 may determine whether the power control logic 2505 operates normally by comparing the power test pattern TEST_P and the result data OUT_P.

For example, the BIST circuit 2501 may generate a first power test pattern TEST_P and transmit the first power test pattern TEST_P to the power control logic 2505. The power control logic 2505 generates first result data OUT_P in response to the first power test pattern TEST_P and transmits the first result data OUT_P to the BIST circuit 2501. First data corresponding to the generated first result data OUT_P may be stored in advance in the BIST circuit 2501. The BIST circuit 2501 may compare the first result data OUT_P with the first data. The BIST circuit 2501 may determine that the power control logic 2505 is normal when the first result data OUT_P and the first data are the same. When the comparison shows that the first result data OUT_P is and the first data are not the same, the BIST circuit 2501 may determine that the power control logic 2505 is abnormal. In addition, the BIST circuit 2501 may determine that the power control logic 2505 is abnormal, rather than normal, when the first result data OUT_P is received after a certain time from the time when the first power test pattern TEST_P is transmitted.

In some embodiments, the BIST circuit 2501 may check whether the diagnosis logic 2503 normally operates. For example, the BIST circuit 2501 may generate a diagnosis test pattern TEST_D to determine whether the diagnosis logic 2503 normally operates. The BIST circuit 2501 may transmit the diagnosis test pattern TEST_D to the diagnosis logic 2503. The diagnosis logic 2503 may generate result data OUT_D in response to the diagnosis test pattern TEST_D, and may transmit the result data OUT_D to the BIST circuit 2501. The BIST circuit 2501 may compare the diagnosis test pattern TEST_D and the result data OUT_D to determine whether the diagnosis logic 2503 normally operates.

For example, the BIST circuit 2501 may generate a second diagnosis test pattern TEST_D and transmit the same to the diagnosis logic 2503. The diagnosis logic 2503 generates second result data OUT_D in response to the second diagnosis test pattern TEST_D, and transmits the second result data OUT_D to the BIST circuit 2501. Second data corresponding to the generated second diagnosis test pattern TEST_D may be stored in advance in the BIST circuit 2501. The BIST circuit 2501 may compare the second result data OUT_D and the second data. The BIST circuit 2501 may determine that the diagnosis logic 2503 is normal when the second result data OUT_D and the second data are the same. When the second result data OUT_D is not the same as the second data, the BIST circuit 2501 may determine that the diagnosis logic 2503 is abnormal rather than normal. In addition, the BIST circuit 2501 may determine that the diagnosis logic 2503 is abnormal, rather than normal, when the second result data OUT_D is received after a certain time from the time when the second diagnosis test pattern TEST_D is transmitted.

The diagnosis logic 2503 may perform a test operation to check whether the moisture detection sensor 26 and storage device 22 operate normally. In some embodiments, when the diagnosis logic 2503 determines that the self-diagnosis operation performed by the BIST circuit 2501 is normal, the diagnosis logic 2503 may determine whether other components within the storage system 20 are operating normally.

In some embodiments, the diagnosis logic 2503 may check whether the moisture detection sensor 26 is operating normally. For example, the diagnosis logic 2503 may generate a sensor test pattern TEST_MS for determining whether the moisture detection sensor 26 operates normally. The diagnosis logic 2503 may transmit the sensor test pattern TEST_MS to the moisture detection sensor 26. The moisture detection sensor 26 may generate result data OUT_MS in response to the sensor test pattern TEST_MS, and may transmit the result data OUT_MS to the diagnosis logic 2503. The diagnosis logic 2503 may compare the sensor test pattern TEST_MS and the result data OUT_MS to determine whether the moisture detection sensor 26 normally operates. The diagnosis logic 2503 may determine that the moisture detection sensor 26 is not normal when the result data OUT_MS is received after a certain time from when the sensor test pattern TEST_MS is transmitted.

In some embodiments, the diagnosis logic 2503 may receive the moisture signal SIG_M from the moisture detection sensor 26. The diagnosis logic 2503 may determine the amount of moisture present in the storage system 20 based on the moisture signal SIG_M. The diagnosis logic 2503 may determine that the storage system 20 is abnormal when the amount of moisture is greater than the predetermined amount of moisture.

In some embodiments, the diagnosis logic 2503 may determine whether the storage device 22 normally operates. For example, the diagnosis logic 2503 may determine whether each of the memory controller 200 and the memory device 250 in the storage device 22 normally operates.

The diagnosis logic 2503 may determine whether the memory controller 200 normally operates. The diagnosis logic 2503 may generate controller test pattern TEST_MC for determining whether the memory controller 200 normally operates. The diagnosis logic 2503 may transmit the controller test pattern TEST_MC to the memory controller 200. The memory controller 200 may generate result data OUT_MC in response to the controller test pattern TEST_MC, and may transmit the result data OUT_MC to the diagnosis logic 2503. The diagnosis logic 2503 may compare the controller test pattern TEST_MC and result data OUT_MC to determine whether the memory controller 200 is operating normally.

For example, the controller test pattern TEST_MC may include a command for checking the state of the memory controller 200. The memory controller 200 may have a busy state in which internal operations are performed or a ready state in which internal operations are completed. The memory controller 200 may output a signal indicating a ready state or a busy state as the result data OUT_MC in response to receiving a command for checking a state from the diagnosis logic 2503. For example, the memory controller 200 may output the result data OUT_MC through a ready/busy R/B pin. When the memory controller 200 does not include the R/B pin, the memory controller 200 may output the result data OUT_MC through another pin. The diagnosis logic 2503 may determine whether the memory controller 200 normally operates based on the result data OUT_MC.

The memory controller 200 may perform a refresh operation to refresh memory cells in the memory device 250 with a predetermined cycle. As the refresh operation is performed, an accurate charge corresponding to data may be stored in the memory cell of the memory device 250. However, when the memory controller 200 maintains a busy state for a period of time or more, a refresh operation for a memory cell in the memory device 250 may not be properly performed. Accordingly, the memory cell may not store accurate data. Accordingly, the diagnosis logic 2503 may determine that the memory controller 200 is abnormal when the memory controller 200 outputs a signal indicating a busy state as the result data OUT_MC for a predetermined time or more.

As another example, the controller test pattern TEST_MC may further include a command for checking an identification (ID) of the memory controller 200. The memory controller 200 may include an ID for identifying each memory controller 200 among several memory controllers. In some embodiments, the diagnosis logic 2503 may transmit a command for checking an ID of the memory controller 200 to the memory controller 200 after receiving the result data OUT_MC that instructs the ready state of the memory controller 200 from the memory controller 200.

The memory controller 200 may output a signal indicating the ID of the memory controller 200 as result data OUT_MC in response to receiving the command for checking the ID. In some embodiments, the ID of the memory controller 200 may be stored in, for example, a register within the memory controller 200. The diagnosis logic 2503 may determine whether the memory controller 200 is normally operating based on the result data OUT_MC.

In some embodiments, the memory controller 200 may include a separate BIST circuit. When the memory controller 200 receives the controller test pattern TEST_MC, the BIST circuit in the memory controller 200 operates to independently determine whether the memory controller 200 operates normally. The memory controller 200 may generate an operation result according to its internal BIST circuit. The memory controller 200 may transmit the result generated by the BIST circuit as result data OUT_MC to the diagnosis logic 2503 in response to the controller test pattern TEST_MC. The diagnosis logic 2503 may determine whether the memory controller 200 is normally operating based on the result data OUT_MC.

In addition, the diagnosis logic 2503 may determine whether the memory device 250 is operating normally. The diagnosis logic 2503 may generate a device test pattern TEST_MD for determining whether the memory device 250 normally operates. The diagnosis logic 2503 may transmit the device test pattern TEST_MD to the memory device 250. The memory device 250 may generate result data OUT_MD in response to the device test pattern TEST_MD, and may transmit the result data OUT_MD to the diagnosis logic 2503. The diagnosis logic 2503 may determine whether the memory device 250 is operating normally by comparing the device test pattern TEST_MD and result data OUT_MD.

For example, the device test pattern TEST_MD may include a command for checking the state of the memory device 250. The memory device 250 may output a signal indicating a ready state or a busy state as the result data OUT_MD in response to receiving the command for checking a state from the diagnosis logic 2503. For example, the memory device 250 may output the result data OUT_MD through the R/B pin. The diagnosis logic 2503 may determine whether the memory device 250 operates normally based on the result data OUT_MD.

The memory device 250 may perform an operation of refreshing a memory cell at a predetermined period under the control of the memory controller 200. As the refresh operation is performed, an accurate charge corresponding to data may be stored in the memory cell of the memory device 250. However, when the memory controller 200 maintains a busy state for a period of time or more, a refresh operation for a memory cell in the memory device 250 may not be properly performed. Accordingly, the memory cell may not store accurate data. Accordingly, the diagnosis logic 2503 may determine that the memory device 250 is abnormal when the memory device 250 outputs a signal indicating a busy state as the result data OUT_MD for a predetermined time or more.

As another example, the device test pattern TEST_MD may further include a command for checking an identification (ID) of the memory device 250. The memory device 250 may include an ID for identifying each memory device 250 among several memory controllers. Each memory device 250 may be assigned a unique ID. In some embodiments, the diagnosis logic 2503 may transmit a command for checking an ID of the memory device 250 to the memory device 250 after receiving the result data OUT_MD that instructs the ready state of the memory device 250 from the memory device 250.

The memory device 250 may output a signal indicating the ID of the memory device 250 as the result data OUT_MD in response to receiving the command for checking the ID. The signal indicating the ID of the memory device 250 may include information about the position of the memory device 250 in the storage device 22, the type of the memory device 250, and the like. In some embodiments, the memory device 250 may include an ID pin for outputting a signal indicating an ID of the memory device 250. In another embodiment, the memory device 250 may include at least one data pin for outputting data stored in the memory device 250. For example, the memory device 250 may output the result data OUT_MD through an ID pin or at least one data pin. The diagnosis logic 2503 may determine whether the memory device 250 operates normally based on the result data OUT_MD.

In summary, the diagnosis logic 2503 may determine whether each of the moisture detection sensor 26, the memory controller 200, and the memory device 250 is operating normally. The diagnosis logic 2503 may generate a diagnosis signal SIG_D that controls the operation of the power control logic 2505 according to whether each of the moisture detection sensor 26, the memory controller 200, and the memory device 250 is normally operating.

The power control logic 2505 may control the second PMIC 24 to provide power supplied from the outside to reflect a configuration in the storage system 20. In some embodiments, the power control logic 2505 may generate a PMIC control signal CTRL_PMIC based on the diagnosis signal SIG_D.

In some embodiments, the diagnosis logic 2503 may control the second PMIC 24 to supply power to the moisture detection sensor 26 while a diagnosis operation is performed for the moisture detection sensor 26.

In some embodiments, while the diagnosis logic 2503 performs a diagnosis operation for the storage device 22, the power control logic 2505 may control the second PMIC 24 to supply power to the storage device 22. For example, while the diagnosis logic 2503 performs a diagnosis operation for the memory controller 200, the power control logic 2505 may control the second PMIC 24 to supply power to the memory controller 200. In addition, while the diagnosis logic 2503 performs a diagnosis operation for the memory device 250, the power control logic 2505 may control the second PMIC 24 to supply power to the memory device 250.

When the diagnosis logic 2503 determines that the moisture detection sensor 26 and the storage device 22 are normal, the power control logic 2505 may control the second PMIC 24 to supply power to the storage device 22. The storage system 20 may read data from the storage device 22. For example, the diagnosis circuit 25 may read data from the storage device 22. After that, the diagnosis circuit 25 may transmit the read data to an external device (30 of FIG. 1) through the debugging port 27. In other words, the external device 30 (refer to FIG. 1) may receive data from the storage device 22 through the debugging port 27 and the diagnosis circuit 25.

When it is determined that the diagnosis logic 2503 does not normally operate, the memory device 250 in the storage device 22 is detached from the memory controller 200 so as not to read data in the memory device 250.

Figure 5:
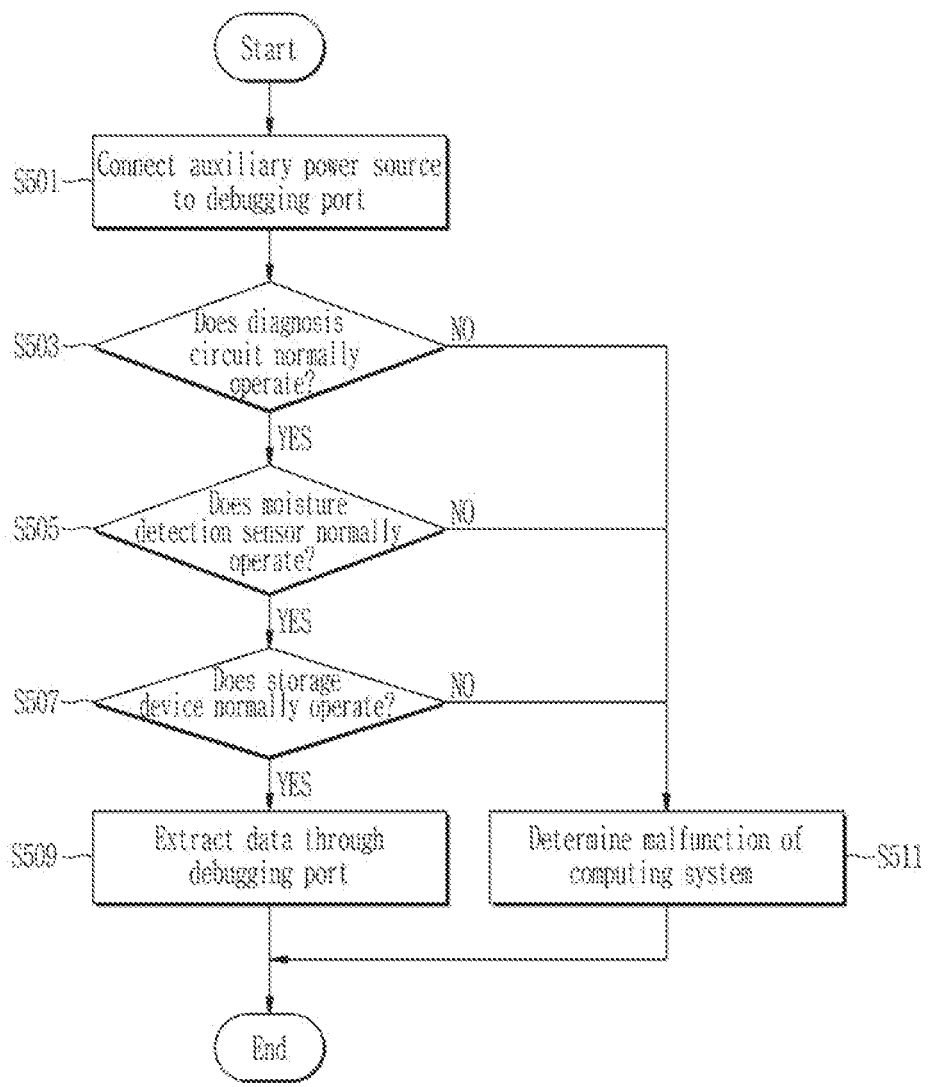
FIG. 5 is a flowchart of an operation method of the storage system of FIG. 1 to FIG. 4.
Figure 6:
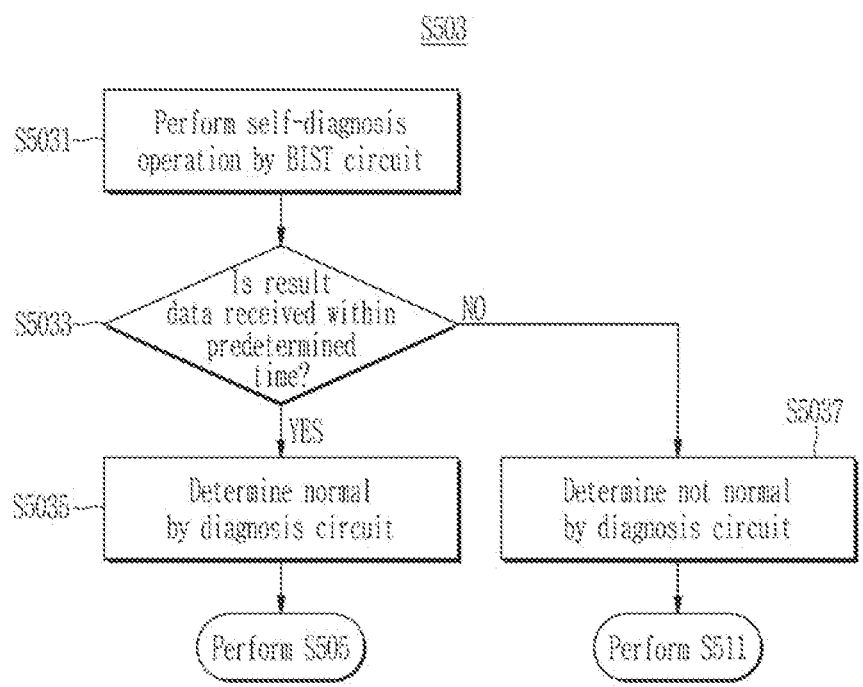
FIG. 6 is a flowchart that shows whether the diagnosis circuit normally operates.
Figure 7:
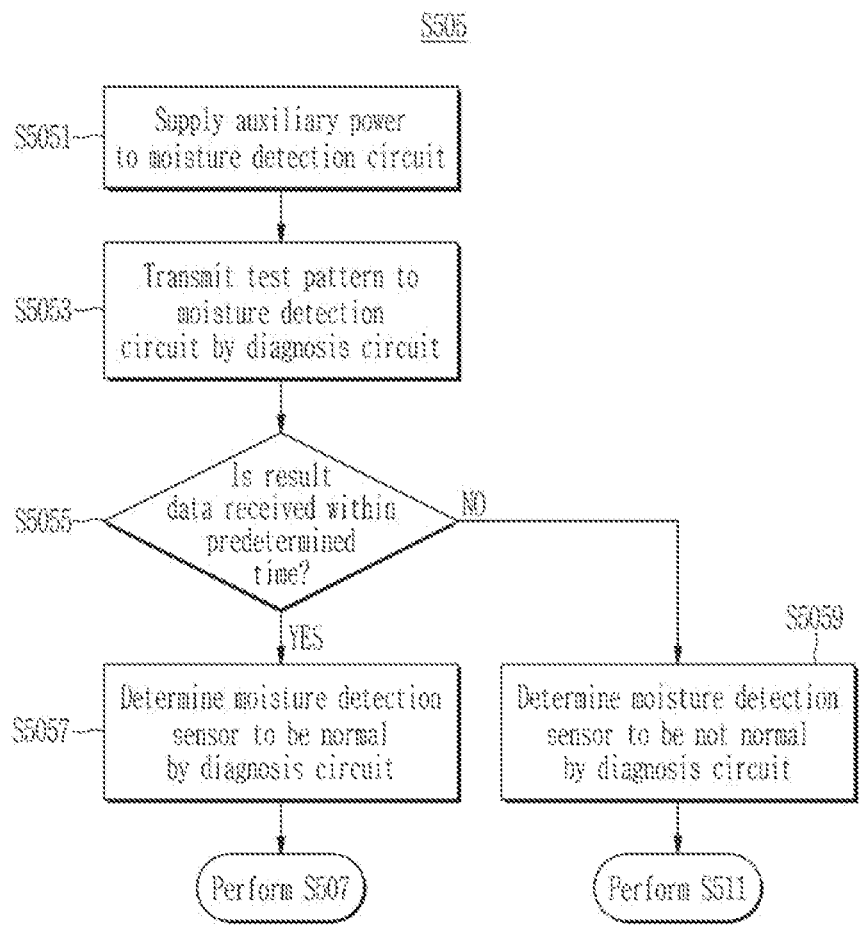
FIG. 7 is a flowchart that illustrates determining whether a moisture detection sensor normally operates.
Figure 8:
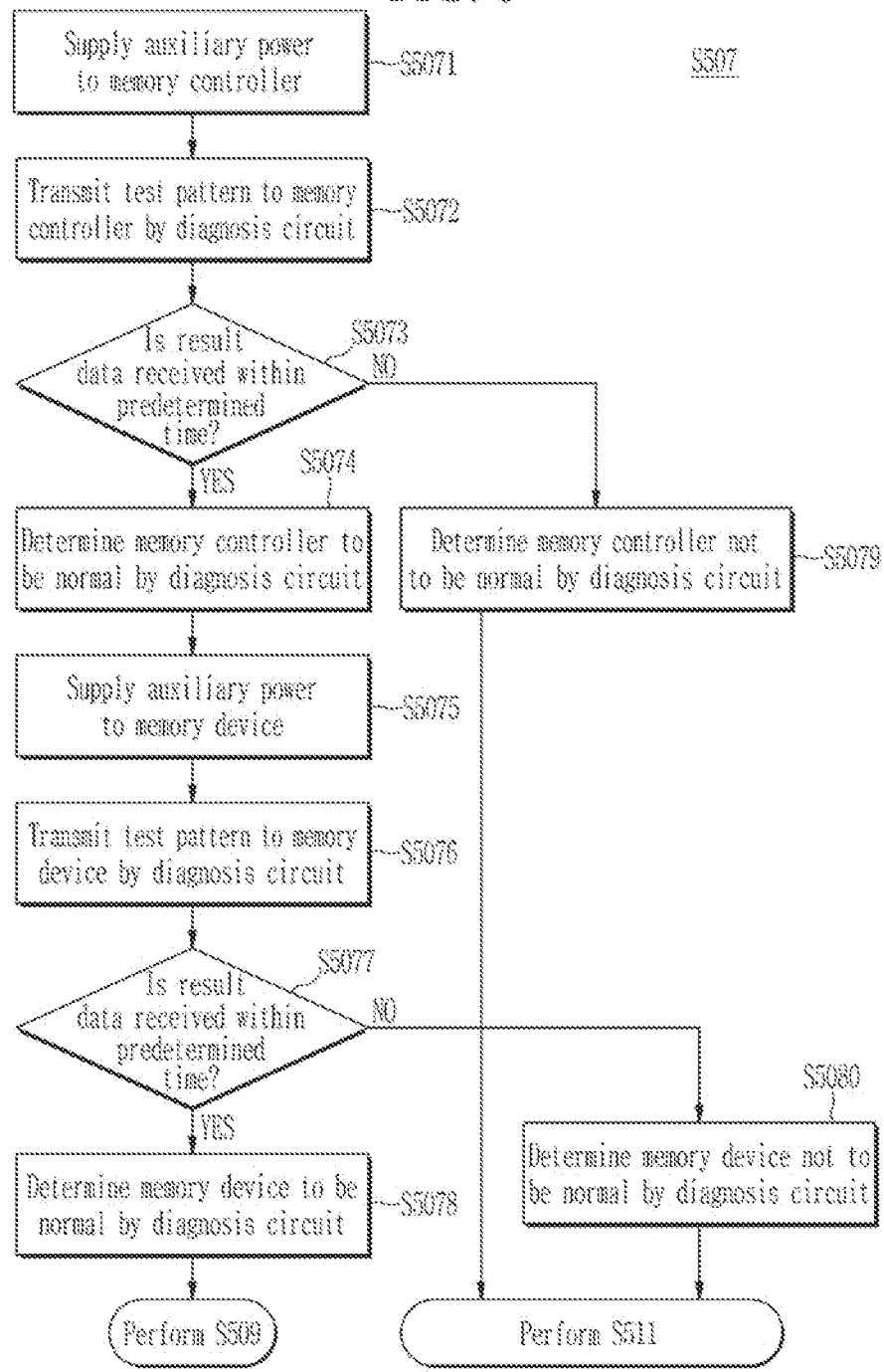
FIG. 8 is a flowchart that illustrates determining whether the storage device normally operates.

FIG. 5 is a flowchart of an operation method of the storage system of FIG. 1 to FIG. 4. In addition, FIG. 6 is a flowchart that shows whether the diagnosis circuit normally operates. FIG. 7 is a flowchart that illustrates determining whether the moisture detection sensor normally operates. FIG. 8 is a flowchart that illustrates determining whether the storage device normally operates.

The computing system 1 may include the host 10 and the storage system 20. The storage system 20 may include the data IO port 21, the storage device 22, the diagnosis circuit 25, the moisture detection sensor 26, and the debugging port 27. The data IO port 21 may be connected to the storage device 22. The debugging port 27 may be connected to the diagnosis circuit 25.

First, an auxiliary power source is connected to the debugging port 27 of the storage system 20 (S501).

Accordingly, auxiliary power may be supplied to the diagnosis circuit 25.

Next, it is determined whether the diagnosis circuit 25 normally operates (S503). The diagnosis circuit 25 may include the BIST circuit 2501, the diagnosis logic 2503, and the power control logic 2505. Regarding the step S503, it will be described with reference to FIG. 6.

Referring to FIG. 6, the BIST circuit 2501 performs a self-diagnosis operation (S5031).

For example, the BIST circuit 2501 may perform the self-diagnosis operation as the auxiliary power is supplied. The self-diagnosis operation may be an operation for testing whether each of the constituent elements in the diagnosis circuit 25 normally operates. For example, the BIST circuit 2501 may test whether the diagnosis logic 2503 and the power control logic 2505 operate normally through self-diagnosis firmware.

In some embodiments, the BIST circuit 2501 may generate a test pattern for determining whether each of the diagnosis logic 2503 and the power control logic 2505 normally operates and transmit the test pattern to each of the diagnosis logic 2503 and the power control logic 2505. Each of the diagnosis logic 2503 and the power control logic 2505 may generate result data in response to the test pattern, and may transmit the result data to the BIST circuit 2501. The BIST circuit 2501 compares the test pattern transmitted to each of the diagnosis logic 2503 and the power control logic 2505 with the result data received from each of the diagnosis logic 2503 and the power control logic 2505 to determine whether the diagnosis logic 2503 and the power control logic 2505 normally operate.

The BIST circuit 2501 determines whether the result data is received within a predetermined time (S5033).

The BIST circuit 2501 determines that the diagnosis circuit 25 does not normally operate when the result data is not received within the predetermined time (S5037).

Next, the storage system 20 performs the step S511.

The storage system 20 determines that the computing system 1 malfunctions at S511.

When the result data is received within the predetermined time, the BIST circuit 2501 determines that the diagnosis circuit 25 is normal (S5035).

Next, the storage system 20 performs the step S505. For example, when the diagnosis circuit 25 normally operates, the storage system 20 determines whether the moisture detection sensor 26 normally operates (S505). The step S505 will be described with reference to FIG. 7.

The second PMIC 24 supplies the auxiliary power to the moisture detection sensor 26 (S5051).

For example, the diagnosis circuit 25 may control the second PMIC to apply power to the moisture detection sensor 26.

The diagnosis circuit 25 transmits the test pattern to the moisture detection sensor 26 (S5053).

In some embodiments, the diagnosis circuit 25 may generate a sensor test pattern for determining whether the moisture detection sensor 26 normally operates and transmits the sensor test pattern to the moisture detection sensor 26. The moisture detection sensor 26 may generate result data in response to the sensor test pattern and transmit the result data to the diagnosis circuit 25. The diagnosis circuit 25 compares the sensor test pattern and the result data to determine whether the moisture detection sensor 26 normally operates.

The diagnosis circuit 25 determines whether the result data is received within a predetermined time from the moisture detection sensor 26 (S5055).

When the result data is not received within the predetermined time, the diagnosis circuit 25 determines that the moisture detection sensor 26 is not normal (S5059).

Next, the storage system 20 performs the step S511. In other words, it is determined that the computing system 1 malfunctions.

When the result data is received within the predetermined time, the diagnosis circuit 25 determines the moisture detection sensor 26 to be normal (S5057).

Next, the storage system 20 performs the step S507. For example, when the moisture detection sensor 26 normally operates, the storage system 20 determines whether the storage device 22 normally operates (S507). The storage device 22 may include the memory controller 200 and the memory device 250. The step S507 will be described with reference to FIG. 8.

Referring to FIG. 8, the second PMIC 24 supplies auxiliary power to the memory controller 200 (S5071).

For example, the diagnosis circuit 25 may control the second PMIC 24 to apply power to the memory controller 200.

The diagnosis circuit 25 transmits a test pattern to the memory controller 200 (S5072).

In some embodiments, the diagnosis circuit 25 may generate a controller test pattern to determine whether the memory controller 200 normally operates and transmit the controller test pattern to the memory controller 200. The memory controller 200 may generate result data in response to the controller test pattern and transmit the result data to the diagnosis circuit 25. The diagnosis circuit 25 compares the controller test pattern and the result data to determine whether the memory controller 200 normally operates.

For example, the controller test pattern may include a command for checking a state of the memory controller 200 and/or a command for checking an ID of the memory controller 200. In some embodiments, the memory controller 200 may include a separate BIST circuit. In response to the memory controller 200 receiving the controller test pattern, an operation result of the BIST circuit in the memory controller 200 may be generated as result data.

The diagnosis circuit 25 determines whether the result data is received from the memory controller 200 within a predetermined time (S5073).

When the result data is not received within the predetermined time, the diagnosis circuit 25 determines that the memory controller 200 is not normal (S5079).

Next, the storage system 20 performs the step S511. In other words, it is determined that the computing system 1 malfunctions.

When the result data is received within the predetermined time, the diagnosis circuit 25 determines that the memory controller 200 is normal (S5074).

Next, the second PMIC 24 supplies auxiliary power to the memory device 250 (S5075).

For example, the diagnosis circuit 25 may control the second PMIC 24 to supply power to the memory device 250.

The diagnosis circuit 25 transmits a test pattern to the memory device 250 (S5076).

In some embodiments, the diagnosis circuit 25 may generate a device test pattern to determine whether the memory device 250 normally operates and transmit the device test pattern to the memory device 250. The memory device 250 may generate result data in response to the device test pattern and transmit the result data to the diagnosis circuit 25. The diagnosis circuit 25 compares the device test pattern and the result data to determine whether the memory device 250 normally operates.

For example, the device test pattern may include a command for checking a state of the memory device 250 and/or a command for checking an ID of the memory device 250.

The diagnosis circuit 25 determines whether the result data is received from the memory device 250 within a predetermined time (S5077).

When the result data is not received within the predetermined time, the diagnosis circuit 25 determines that the memory device 250 is not normal (S5080).

Next, the storage system 20 performs the step S511. In other words, it is determined that the computing system 1 malfunctions.

When the result data is received within the predetermined time, the diagnosis circuit 25 determines the memory device to be normal (S5078).

When the storage device 22 operates normally, the external device 30 extracts data through the debugging port 27 (S509).

For example, the second PMIC 24 may supply auxiliary power to the storage system 20. The storage system 20 may read driving data stored in the storage device 22 and transmit the read driving data to the external device 30. Therefore, the external device 30 may read data from the storage device 22 through the debugging port 27. When the storage device 22 does not operate normally, the external device 30 cannot read data from the storage device 22.

Figure 9:
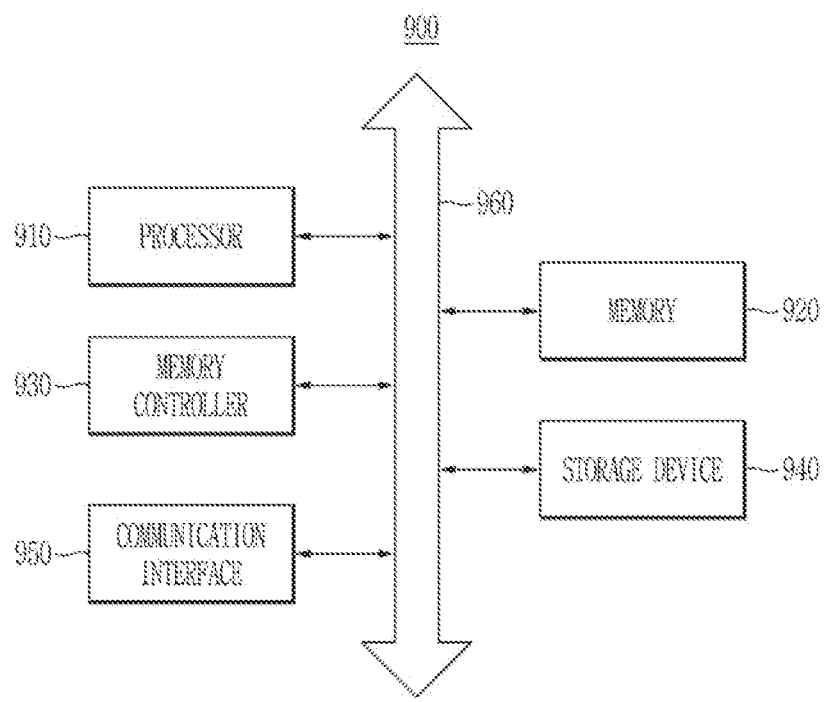
FIG. 9 is a block diagram of a computing system according to an embodiment of the present disclosure.

FIG. 9 is a block diagram of a computing system according to an embodiment of the present disclosure.

Referring to FIG. 9, a computing system 900 includes a processor 910, memory device 920, a memory controller 930, a storage device 940, a communication interface 950, and a bus 960. The computing system 900 may further include other general-purpose constituent elements.

In some embodiments, the computing system 900 may be an in-vehicle data recording system provided in a vehicle.

The processor 910 controls the overall operation of each constituent element of the computing system 900. The processor 910 may be implemented as at least one of various processing units such as a central processing unit (CPU), an application processor (AP), and a graphic processing unit (GPU).

The memory device 920 stores various data and instructions. The memory controller 930 controls transmission of data or instructions to and from the memory device 920. In an embodiment, the memory controller 930 may be provided as a separate chip from the processor 910. In an embodiment, the memory controller 930 may be provided as an internal component of the processor 910.

The storage device 940 non-temporarily stores programs and data. In an embodiment, the storage device 940 may be implemented as the storage device described with reference to FIG. 1 to FIG. 8. The communication interface 950 supports wired and wireless Internet communication of the computing system 900. In addition, the communication interface 950 may support various communication methods other than Internet communication. The bus 960 provides a communication path between the constituent elements of the computing system 900. The bus 960 may include at least one type of bus according to a communication protocol between the constituent elements.

Conventionally, power is supplied through a data IO port of a storage device, in other words, a main power input terminal, and driving data stored in the storage device is read. However, in the event of a vehicle accident, the storage device may sustain damage, such as being submerged in the vehicle or directly to the chip itself. If the driving data is accessed from the storage device in the same manner as before following a vehicle accident, there is a high possibility of secondary damage due to compromised components in the storage device. This greatly increases the risk of additional damage to the driving data.

The computing system 900 according to an embodiment may further include a moisture detection sensor and a diagnosis circuit for detecting whether the vehicle is submerged in addition to the storage device. The computing system 900 may supply power through a debugging port, in other words, an auxiliary power input terminal, and check whether each of the storage device 940, the moisture detection sensor, and the diagnosis circuit operates normally.

Only when each component in the computing system 900 operates normally, does the computing system 900 read the driving data stored in the storage device 940 by connecting the auxiliary power input through the debugging port to the main power input terminal. In other words, after a vehicle accident and the main power supply is cut off to the vehicle, the driving data can be quickly read from the storage device when all components within the computing system 900 are functioning properly. By checking the storage device's operation, if any issues occur in the constituent elements of the computing system 900, the risk of additional data damage in the storage device can be prevented.

Although the embodiments have been described using specific terms in this specification, they are only used for the purpose of describing the technical idea of the present disclosure, and are not intended to limit the meaning or scope of the present disclosure as described in the claims.

What is claimed is:

1. A storage system comprising:
   a storage device comprising a data i/o port that receives power from a host of the storage system;
   a diagnosis circuit that generates a test pattern, transmits the test pattern to the storage device, receives result data corresponding to the test pattern from the storage device, and tests whether the storage device normally operates by comparing the test pattern with the result data; and
   a debugging port that is connected to the diagnosis circuit, receives auxiliary power from an external device external to the host, supplies the auxiliary power to the diagnosis circuit, and transmits data in the storage device to the external device.

2. The storage system of claim 1, wherein:
   the storage device comprises a memory device in which driving data is stored and a memory controller controlling access to the memory device, and
   the diagnosis circuit generates a first test pattern, transmits the first test pattern to the memory controller, receives first result data corresponding to the first test pattern from the memory controller, and tests whether the memory controller normally operates by comparing the first test pattern with the first result data.

3. The storage system of claim 2, wherein:
   the first test pattern comprises at least one of a command for checking a state of the memory controller and a command for checking an identification (ID) of the memory controller.

4. The storage system of claim 1, wherein:
   the storage device comprises a memory device in which driving data is stored and a memory controller controlling access to the memory device, and
   the diagnosis circuit generates a first test pattern, transmits the first test pattern to the memory controller, receives first result data corresponding to the first test pattern from the memory controller, and determines that the memory controller is not normally operating when the first result data is received after a predetermined time starting from the time of transmitting the first test pattern.

5. The storage system of claim 2, wherein:
   the diagnosis circuit generates a second test pattern when the memory controller is determined to be normally operating, transmits the second test pattern to the memory device, receives second result data corresponding to the second test pattern from the memory device, and tests whether the memory device normally operates by comparing the second test pattern with the second result data.

6. The storage system of claim 5, wherein:
   the second test pattern comprises at least one of a command for checking a state of the memory device and a command for checking an identification (ID) of the memory device.

7. The storage system of claim 2, wherein:
   the diagnosis circuit the diagnosis circuit generates a second test pattern when the memory controller is determined to be normally operating, transmits the second test pattern to the memory device, receives second result data corresponding to the second test pattern from the memory device, and determines that the memory device is not normally operating when the second result data is received after a predetermined time starting from the time of transmitting the second test pattern.

8. The storage system of claim 5, further comprising a moisture detection sensor that detects moisture in the storage system,
   wherein the diagnosis circuit generates a third test pattern, transmits the third test pattern to the moisture detection sensor, receives third result data corresponding to the third test pattern from the moisture detection sensor, and tests whether the moisture detection sensor normally operates by comparing the third test pattern with the third result data.

9. The storage system of claim 5, further comprising a moisture detection sensor that detects moisture in the storage system, wherein:
   the diagnosis circuit generates a third test pattern, transmits the third test pattern to the moisture detection sensor, receives third result data corresponding to the third test pattern from the moisture detection sensor, and determines that the moisture detection sensor is not normally operating when the third result data is received after a predetermined time starting from the time of transmitting the third test pattern.

10. The storage system of claim 8, further comprising a power management integrated circuit (PMIC) that receives the auxiliary power from the debugging port, and supplies power to at least one of the storage device and the moisture detection sensor under control of the diagnosis circuit,
    wherein the diagnosis circuit controls the PMIC to supply power to the memory controller while testing whether the memory controller normally operates, controls the PMIC to supply power to the memory device while testing whether the memory device normally operates, and controls the PMIC to supply power to the moisture detection sensor while testing whether moisture detection sensor normally operates.

11. The storage system of claim 1, further comprising:
    a moisture detection sensor that detects moisture in the storage system; and
    a power management integrated circuit (PMIC) that receives the auxiliary power from the debugging port, and supplies power to at least one of the storage device and the moisture detection sensor under control of the diagnosis circuit,
    wherein the diagnosis circuit comprises a built-in self-test (BIST) circuit for testing whether the diagnosis circuit normally operates as the auxiliary power is supplied, a diagnosis logic for testing whether the storage device normally operates, and a power control logic controlling the PMIC, the BIST circuit determines whether the BIST circuit normally operates by comparing a calculated result value obtained by performing a predetermined calculation with a result value stored in the BIST circuit, generates a fourth test pattern, transmits the fourth test pattern to the diagnosis logic, receives fourth result data corresponding to the fourth test pattern from the diagnosis logic, determines whether the diagnosis logic normally operates by comparing the fourth test pattern with the fourth result data, generates a fifth test pattern, transmits the fifth test pattern to the power control logic, receives fifth result data corresponding to the fifth test pattern from the power control logic, and determines whether the power control logic normally operates by comparing the fifth test pattern with the fifth result data.

12. The storage system of claim 11, wherein:
the BIST circuit determines that the diagnosis circuit is not normally operating when the fourth result data is received after a predetermined time starting from the time of transmitting the fourth test pattern or when the fifth result data is received after a predetermined time starting from the time of transmitting the fifth test pattern.

13. The storage system of claim 1, wherein:
the debugging port communicates with the external device through a side band interface (SBI).

14. An operation method of a storage system, comprising:
connecting auxiliary power to a debugging port of a storage system including a storage device in which driving data about a vehicle and its drivers are stored, wherein auxiliary power is provided by an external auxiliary power source different from a main power source for the storage system;
determining whether a diagnosis circuit, which tests whether the storage device normally operates as the auxiliary power is input, normally operates by using a built-in self-test (BIST) circuit in the diagnosis circuit;
determining whether the storage device normally operates when the diagnosis circuit normally operates; and
reading the driving data through the debugging port when the storage device normally operates.

15. The operation method of the storage system of claim 14, wherein:
the determining whether the diagnosis circuit normally operates comprises:
determining whether the BIST circuit normally operates by comparing a calculated result value obtained by performing a predetermined calculation and a result value stored in the BIST circuit, by the BIST circuit;
generating a first test pattern and transmitting the first test pattern to a diagnosis logic for testing whether the storage device normally operates, and generating a second test pattern and transmitting the second test pattern to a power control logic, the power control logic controlling a power management integrated circuit (PMIC) supplying the auxiliary power to at least one of the storage device and a moisture detection sensor for detecting moisture in the storage system;
receiving first result data corresponding to the first test pattern from the diagnosis logic and receiving second result data corresponding to the second test pattern from the power control logic;

determining that the diagnosis logic is normally operating when the first result data is received within a predetermined time starting from the time of transmitting of the first test pattern and the second result data is received within a predetermined time starting from the time of transmitting the second test pattern.

16. The operation method of the storage system of claim 14, wherein:
the determining whether the storage device normally operates comprises:
supplying the auxiliary power to a memory controller that controls access to a memory device;
generating a third test pattern and transmitting the third test pattern to the memory controller by the diagnosis circuit;
receiving third result data corresponding to the third test pattern from the memory controller; and
determining that the memory controller is normally operating when the third result data is received within a predetermined time starting from the time of transmitting the third test pattern.

17. The operation method of the storage system of claim 16, wherein, when the memory controller is normally operating, the determining that the storage device normally operates comprises:
supplying the auxiliary power to the memory device;
generating a fourth test pattern and transmitting the fourth test pattern to the memory device by the diagnosis circuit;
receiving fourth result data corresponding to the fourth test pattern from the memory device; and
determining that the memory device is normally operating when the fourth result data is received within a predetermined time starting from the time of transmitting the fourth test pattern.

18. The operation method of the storage system of claim 14, further comprising,
when the diagnosis circuit normally operates, determining whether a moisture detection sensor for detecting moisture in the storage system normally operates,
wherein the determining whether the storage device normally operates comprises determining whether the storage device normally operates when the diagnosis circuit normally operates and the moisture detection sensor normally operates.

19. The operation method of the storage system of claim 18, wherein:
the determining whether the moisture detection sensor normally operates comprises:
supplying the auxiliary power to the moisture detection sensor;
generating a fifth test pattern and transmitting the fifth test pattern to the moisture detection sensor by the diagnosis circuit;
receiving fifth result data corresponding to the fifth test pattern from the moisture detection sensor; and
determining that the moisture detection sensor is normally operating when the fifth result data is received within a predetermined time starting from the time of transmitting the fifth test pattern.

20. A computing system comprising:
an external device; and
a storage system that includes a storage device in which driving data about a vehicle and its drivers are stored, and a diagnosis circuit that generates a test pattern, transmits the test pattern to the storage device, receives result data corresponding to the test pattern from the storage device, and determines whether the storage device normally operates by comparing the test pattern with the result data, wherein the storage device receives main power from a main power source different from the external device, wherein the diagnosis circuit generates the test pattern in response to receiving auxiliary power from the external device, and wherein the storage system transmits the driving data to the external device through a side band interface (SBI) when the storage device is normally operating.

\* \* \* \* \*